(12) United States Patent
Ohbitsu

(10) Patent No.: US 9,319,695 B2
(45) Date of Patent: Apr. 19, 2016

(54) MOVING IMAGE OUTPUT APPARATUS AND METHOD

(71) Applicant: FUJITSU LIMITED, Kawasaki-shi, Kanagawa (JP)

(72) Inventor: Toshiro Ohbitsu, Akishima (JP)

(73) Assignee: FUJITSU LIMITED, Kawasaki (JP)

( * ) Notice: Subject to any disclaimer, the term of this patent is extended or adjusted under 35 U.S.C. 154(b) by 747 days.

(21) Appl. No.: 13/653,821

(22) Filed: Oct. 17, 2012

(65) Prior Publication Data

US 2013/0038802 A1 Feb. 14, 2013

Related U.S. Application Data

(63) Continuation of application No. PCT/JP2010/057616, filed on Apr. 28, 2010.

(51) Int. Cl.
| | |
|---|---|
| *H04N 19/55* | (2014.01) |
| *H04N 19/132* | (2014.01) |
| *H04N 19/172* | (2014.01) |
| *H04N 19/156* | (2014.01) |
| *H04N 19/44* | (2014.01) |

(52) U.S. Cl.
CPC ............ *H04N 19/132* (2014.11); *H04N 19/156* (2014.11); *H04N 19/172* (2014.11); *H04N 19/44* (2014.11)

(58) Field of Classification Search
CPC . H04N 5/783; H04N 9/7921; H04N 13/0029; H04N 21/8547; H04N 21/242
See application file for complete search history.

(56) References Cited

U.S. PATENT DOCUMENTS

| | | | | |
|---|---|---|---|---|
| 2002/0039478 | A1* | 4/2002 | Ono et al. ................. | 386/46 |
| 2006/0067406 | A1 | 3/2006 | Kitada et al. | |
| 2006/0203909 | A1 | 9/2006 | Kitada et al. | |
| 2007/0053655 | A1* | 3/2007 | Fujiwara ................... | 386/68 |

(Continued)

FOREIGN PATENT DOCUMENTS

| | | |
|---|---|---|
| JP | 05-216800 A | 8/1993 |
| JP | 07-327214 A | 12/1995 |

(Continued)

OTHER PUBLICATIONS

International Search Report dated Jun. 15, 2010 as received in application No. PCT/JP2010/057616.

(Continued)

*Primary Examiner* — Jay Patel
*Assistant Examiner* — Neil Mikeska
(74) *Attorney, Agent, or Firm* — Maschoff Brennan

(57) ABSTRACT

A moving image output device includes a moving image acquisition unit to acquire moving image data which represents a moving image as a collection of a plurality of images, a image generation unit to generate each piece of image data which represents each image of the moving image by processing the moving image data acquired by the moving image acquisition unit, an image output unit to sequentially output each piece of image data generated by the image generation unit according to a set time interval, and an interval setting unit to set to the image output unit a first time interval, and temporarily setting to the image output unit a second time interval which is longer than the first time interval as for image data for which the image generation by the image generation unit fails to occur in time with the sequential image output with the first time interval.

17 Claims, 20 Drawing Sheets

(56) References Cited

U.S. PATENT DOCUMENTS

| | | | |
|---|---|---|---|
| 2007/0086751 A1* | 4/2007 | Matsumoto | 386/117 |
| 2007/0140355 A1 | 6/2007 | Uchida et al. | |
| 2007/0160129 A1 | 7/2007 | Fujisawa et al. | |
| 2007/0189735 A1 | 8/2007 | Kawashima et al. | |
| 2007/0201555 A1 | 8/2007 | Kikuchi et al. | |
| 2007/0292110 A1* | 12/2007 | Nishi et al. | 386/92 |
| 2010/0046611 A1* | 2/2010 | Toma et al. | 375/240.01 |
| 2010/0209074 A1* | 8/2010 | Kondo et al. | 386/68 |
| 2012/0036547 A1* | 2/2012 | Aoyanagi et al. | 725/116 |

FOREIGN PATENT DOCUMENTS

| | | |
|---|---|---|
| JP | 2001-045491 | 2/2001 |
| JP | 2001-045491 A | 2/2001 |
| JP | 2002-159011 A | 5/2002 |
| JP | 2003-153261 | 5/2003 |
| JP | 2003-153261 A | 5/2003 |
| JP | 2006-101321 A | 4/2006 |
| JP | 2006-101322 A | 4/2006 |
| JP | 2006-101323 A | 4/2006 |
| JP | 2006-101402 A | 4/2006 |
| JP | 2006-101403 A | 4/2006 |
| JP | 2006-101404 A | 4/2006 |
| JP | 2006-101405 A | 4/2006 |
| JP | 2006-101406 A | 4/2006 |
| JP | 2006-211485 A | 8/2006 |
| JP | 2006-254231 A | 9/2006 |
| JP | 2007-174196 A | 7/2007 |
| JP | 2007-184871 A | 7/2007 |
| JP | 2007-195064 A | 8/2007 |
| JP | 2007-208476 A | 8/2007 |
| JP | 2007-235447 A | 9/2007 |
| JP | 2009-182891 A | 8/2009 |

OTHER PUBLICATIONS

International Preliminary Report on Patentability mailed on Jan. 17, 2013 in application No. PCT/JP2010/057616.
Notice of Reason for Rejection dated Apr. 22, 2014 with its English translation issued in the corresponding Japanese application No. 2012-512597 Full translation.

* cited by examiner

FIG. 11
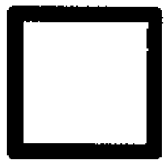
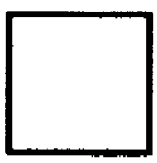
DECODED PIXEL
PREDICTED PIXEL
MODE 2 DC

MODE 4 DIAG DOWN/RIGHT

DECODED PIXEL

PREDICTED PIXEL

MODE 6 HORIZONTAL DOWN

☐ DECODED PIXEL
☐ PREDICTED PIXEL

MODE 8 HORIZONTAL UP

MOVING IMAGE OUTPUT APPARATUS AND METHOD

CROSS-REFERENCE OF RELATED APPLICATION

This application is a continuation application of International Application PCT/JP2010/057616 filed on Apr. 28, 2010, the entire contents of which are incorporated herein by reference.

FIELD

The disclosure herein relates to an moving image output apparatus, method and computer-readable storage medium for outputting moving images based on moving image data.

BACKGROUND

The shift to low-end personal computers (hereinafter referred to as "PCs") is increasingly becoming popular these days, and the prices of the parts used in the PCs are kept low for keeping the prices of the PCs low, and therefore the performances of the PCs are kept low accordingly.

For low-end notebook personal computers (hereinafter referred to as "note PCs"), 1.6 GHz Central Processing Unit (CPU) processors, for example, are used for running programs thereof.

It is hard to say that the CPU speed of 1.6 GHz is high lately. The reason is that with this CPU speed it is possible that the CPUs cannot process the reproduction of moving images along with the display of the moving images when reproducing high-definition moving images for the distribution on the Internet.

In such cases where the reproduction of moving images is not processed in time with the display of the moving images, the dropping frames of the moving images or the freeze of the PC will occur.

Such high-definition moving image content for the distribution includes, for example, content according to H. 264/ AVC mode, which belongs to a content type of what is called MPEG4.

In addition, technologies are developed for particular reproductions such as slow-motion, still and frame-by-frame reproductions (for example, see Patent Document 1).

Besides, technologies are also developed for the mutual communications of video images between workstations having different specifications for frame period (for example, see Patent Document 2).

Moreover, technologies are also developed for processing the reproductions of moving images while decreasing the loads thereof on the low-end note PCs as described above (see Patent Documents 3 to 15).

[Patent document 1]
Japanese Laid-Open Patent Publication No. 2007-195064
[Patent document 2]
Japanese Laid-Open Patent Publication No. H05-216800
[Patent document 3]
Japanese Laid-Open Patent Publication No. 2006-101321
[Patent document 4]
Japanese Laid-Open Patent Publication No. 2006-101322
[Patent document 5]
Japanese Laid-Open Patent Publication No. 2006-101323
[Patent document 6]
Japanese Laid-Open Patent Publication No. 2006-101402
[Patent document 7]
Japanese Laid-Open Patent Publication No. 2006-101403
[Patent document 8]
Japanese Laid-Open Patent Publication No. 2006-101404
[Patent document 9]
Japanese Laid-Open Patent Publication No. 2006-101405
[Patent document 10]
Japanese Laid-Open Patent Publication No. 2006-101406
[Patent document 11]
Japanese Laid-Open Patent Publication No. 2006-254231
[Patent document 12]
Japanese Laid-Open Patent Publication No. 2007-174196
[Patent document 13]
Japanese Laid-Open Patent Publication No. 2007-208476
[Patent document 14]
Japanese Laid-Open Patent Publication No. 2007-235447
[Patent document 15]
Japanese Laid-Open Patent Publication No. 2009-182891

SUMMARY

However, the technologies disclosed in Patent Documents 1 and 2 as described above are the ones for changing the specifications for frame period and the like, and not the ones for solving problems in which the reproduction of moving images is not processed in time with the display of the moving images.

Additionally, in the technologies disclosed in Patent Documents 3 to 15, some of the original decoding processes are omitted, simplified or reduced in order to handle high loads, and therefore these technologies cannot take the full advantage of the original image formats and the image quality is deteriorated as a result.

Although the above description assumes that the reproduction processes of moving images are run in a CPU, using both a CPU and a Graphics Processing Unit (GPU) will face the same problems.

According to an aspect of the embodiments, a moving image output apparatus includes a moving image acquisition unit, an image generation unit, an image output unit and an interval setting unit.

The moving image acquisition unit acquires moving image data, which represents a moving image as a collection of a plurality of images which are successive in time.

The image generation unit generates each piece of image data which represents each image of the moving image by processing the moving image data acquired by the moving image acquisition unit.

The image output unit sequentially outputs each piece of image data generated by the image generation unit according to a set time interval.

The interval setting unit sets to the image output unit a first time interval corresponding to the display speed of the moving image.

In addition, the interval setting unit temporarily sets to the image output unit a second time interval which is longer than the first time interval as for image data for which the generation by the image generation unit fails to occur in time with the sequential output with the first time interval by the image output unit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

FIG. 11 is a diagram explaining Mode 2 of the prediction mode.

DESCRIPTION OF EMBODIMENTS

Specific embodiments of a moving image output apparatus, a moving image output method and a moving image output program will hereinafter be described with reference to the drawings.

Figure 1:
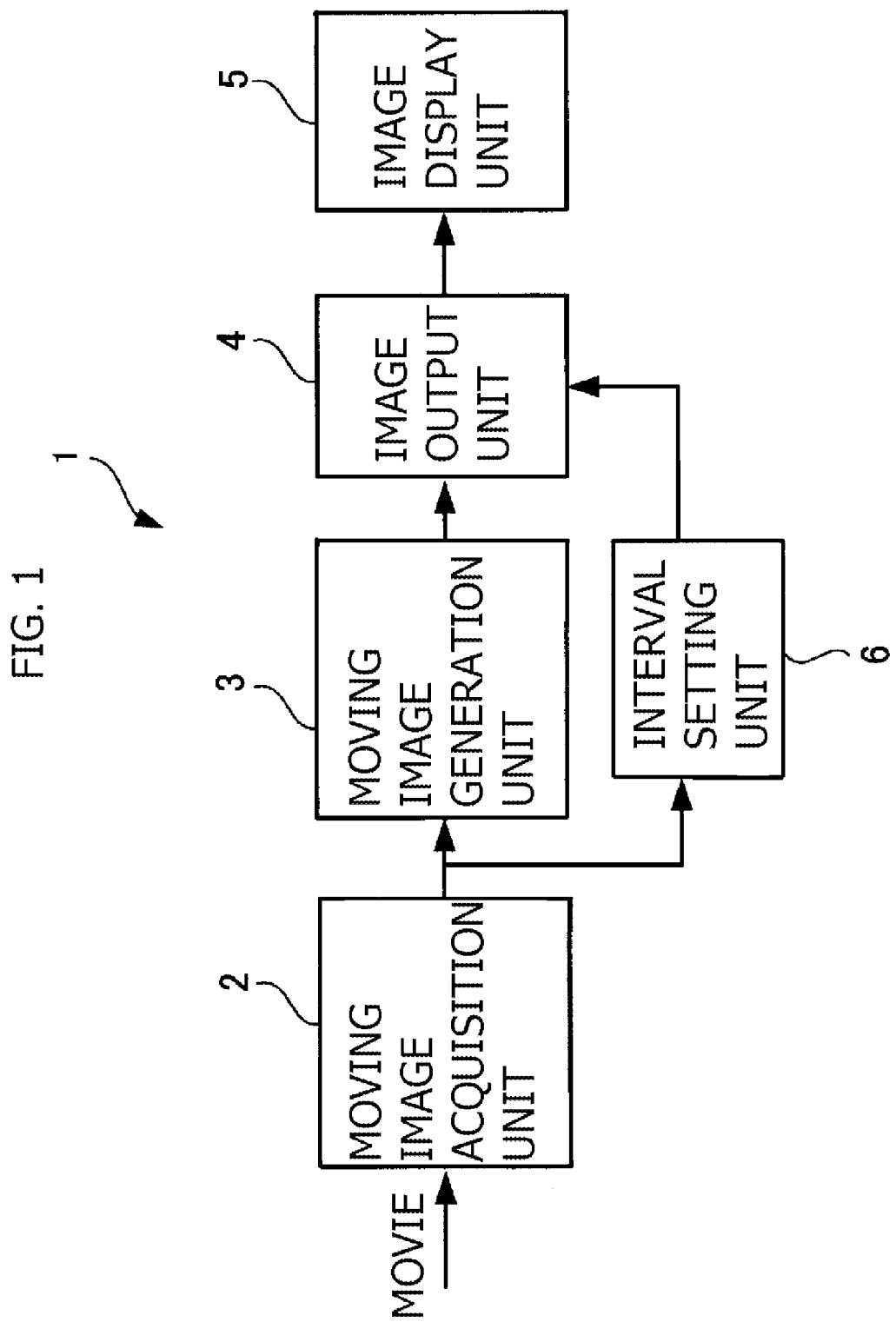
FIG. 1 is a block diagram of a moving image output apparatus according to a first embodiment.

FIG. 1 is a block diagram of a moving image output apparatus according to a first embodiment of the present invention.

The moving image output apparatus 1 includes a processing unit for running programs and a moving image output program which is run in the processing unit. FIG. 1 illustrates functions achieved in the processing unit by running the moving image output program in the processing unit. The moving image output apparatus 1 includes a moving image acquisition unit 2, an image generation unit 3, an image output unit 4, an image display unit 5 and an interval setting unit 6.

The moving image acquisition unit 2 acquires moving image data, which represents moving images as a collection of a plurality of images which are successive in time. The acquisition of image data is executed, for example, through a communication line such as the Internet or by an installation from a portable storage medium such as Digital Video Disc (DVD).

The image generation unit 3 generates each piece of image data which represents each image of the moving images by processing the moving image data acquired by the moving image acquisition unit 2.

The image output unit 4 sequentially outputs each piece of image data generated by the image generation unit 3 according to a set time interval.

The image display unit 5 displays the moving images by sequentially displaying each image represented by each piece of image data based on each piece of image data which is sequentially output from the image output unit 4.

The interval setting unit 6 sets to the image output unit 4 a first time interval corresponding to the display speed of the moving images. In addition, the interval setting unit 6 temporarily sets to the image output unit 4 a second time interval which is longer than the first time interval when the image generation by the generation unit 3 fails to occur in time with the sequential output with the first time interval by the image output unit 4.

The first embodiment described above may also be interpreted as a moving image output method for sequentially executing the functions which are sequentially executed by the units 2 to 6 of the moving image output apparatus 1 illustrated in FIG. 1. Here, note that the drawings and explanations of the moving image output method corresponding to the first embodiment are omitted due to their repetitive explanations.

Next, a second embodiment of the present invention, which is more specific than the first embodiment, is described below.

Figure 2:
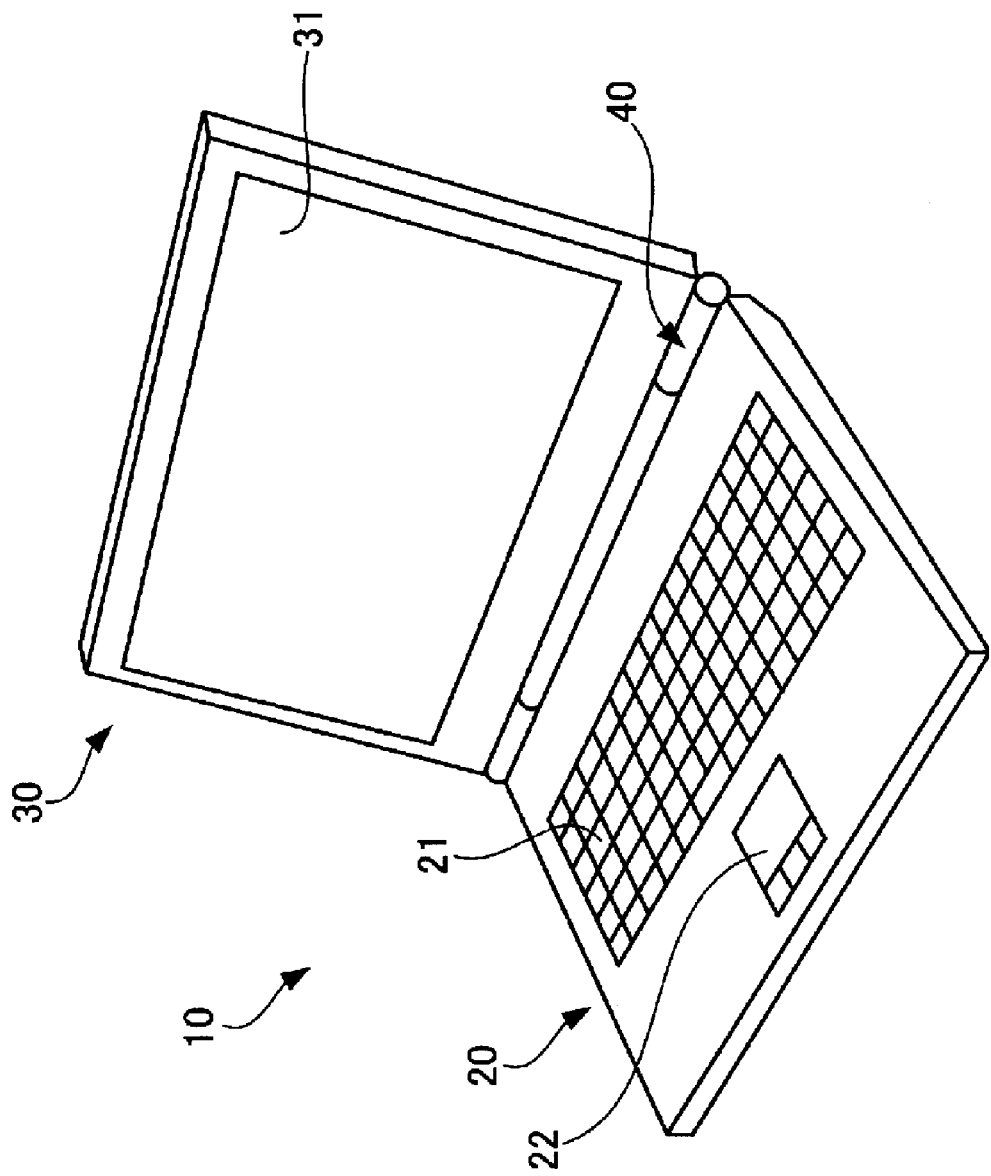
FIG. 2 is an external perspective diagram illustrating an example of a hardware structure of a note PC constructing a second embodiment.

FIG. 2 is an external perspective diagram illustrating an example of a hardware structure of a note PC constructing the second embodiment.

A note PC 10 illustrated in FIG. 2 includes a body unit 20 and a display unit 30. The body unit 20 includes a CPU, a hard disk drive (hereinafter referred to as "HDD") and the like therein, and a keyboard 21 and a touch pad 22, which is a kind of pointing device, and the like thereon. In addition, the display unit 30 is attached to the body unit 10 with hinges 40 so that the display unit 30 is configured to freely open and close with respect to the body unit 20. Besides, the display unit 30 includes a display screen 31, which is provided on the front surface of the display unit 30 when opening the display unit 30.

Figure 3:
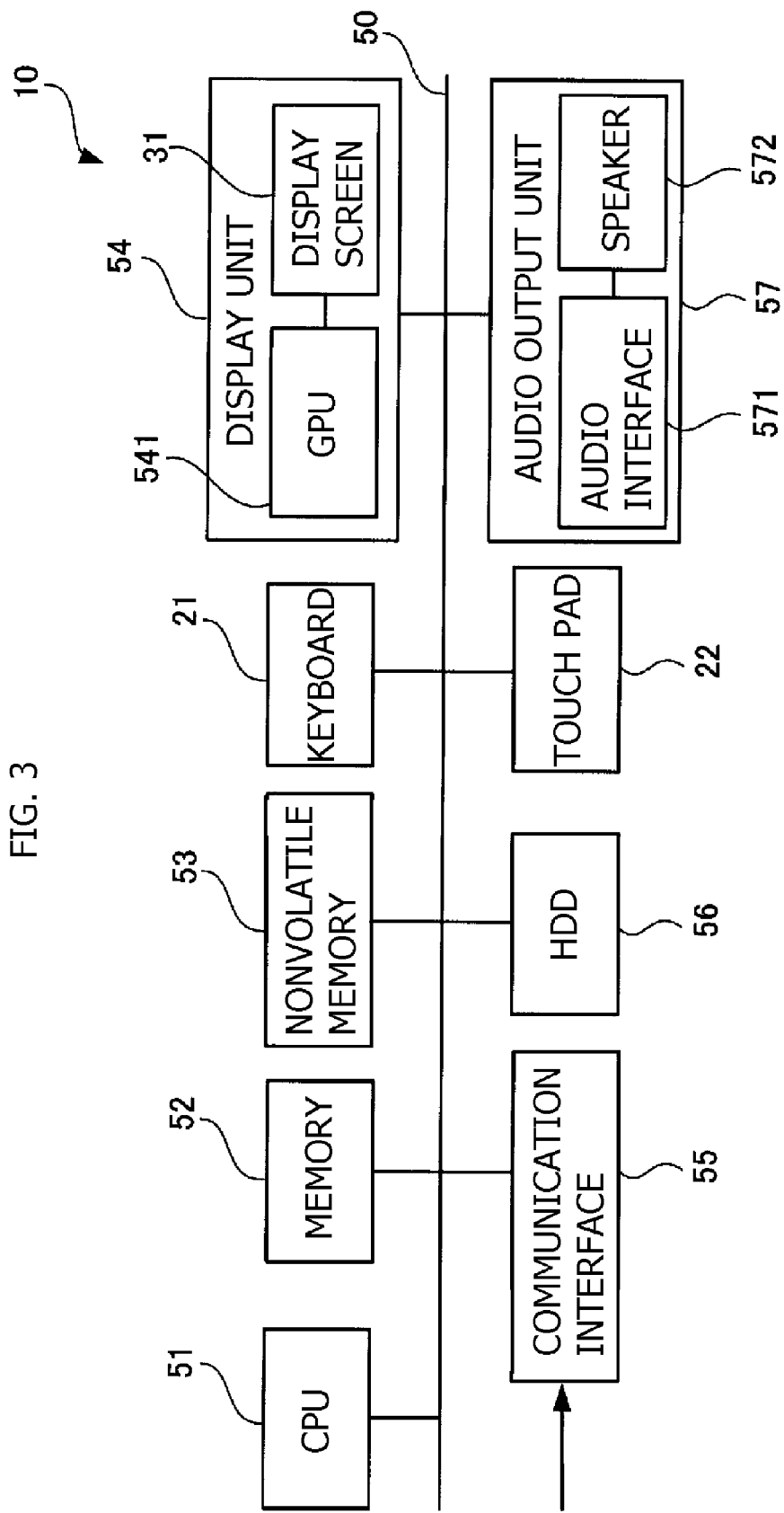
FIG. 3 is a schematic block diagram illustrating the hardware structure of the note PC the perspective view of which is illustrated in FIG. 2.

FIG. 3 is a schematic block diagram illustrating the hardware structure of the note PC the perspective view of which is illustrated in FIG. 2.

FIG. 3 illustrates a CPU 51, a memory 52, a nonvolatile memory 53, the keyboard 21, which is also illustrated in FIG. 2, and a display unit 54 including a GPU 541 and the display screen 31, which is also illustrated in FIG. 2. In addition, FIG. 3 also illustrates a communication interface 55, a HDD 56, the touch pad 22, which is also illustrated in FIG. 2, a audio output unit 57 including an audio interface 571 and a speaker 572. Each of the members 21, 22, 55 to 57 is connected to any other member by way of a bus 50.

The communication interface 55 is connected to the Internet and carries out communications via the Internet. Here, the communication interface 55 particularly receives MPEG4 compliant moving image content. The moving image content includes moving image data, which represents moving images as a collection of a plurality of images which are successive in time, and audio data. That is, the communication interface 55 corresponds to a moving image acquisition unit for acquiring moving image data. The HDD 56 is a mass-storage device and stores various types of programs which include a moving image output program as an embodiment of the present invention and moving image content input via the Internet. The touch pad 22 is a kind of pointing device for moving a cursor displayed on the display screen 31 (see FIG. 2) included in the display unit 54 and clicking any icons and the like displayed on the display screen 31. The audio output unit 57 receives audio data, converts the audio data to analog audio signals by the audio interface 571 and outputs the audio through the speaker 572.

In addition, the CPU 51 is a central processing unit for running programs. A CPU with a processor speed of 1.6 GHz, which is relatively slow, is employed in the note PC 10 used in this embodiment. The memory 52 is a memory for loading programs which are read out from the HDD 56 and run by the CPU 51. Besides, the memory 52 is also used as a temporary data storage place when the CPU 51 runs the programs. The nonvolatile memory 53 stores the Basic Input Output System (BIOS), which is a program run in the initial stage after the note PC 10 is booted. Also, the keyboard 21 is a tool for operators to input various types of information and instructions.

The display unit 54 receives display data and displays images corresponding to the display data on the display screen 31 (see FIG. 2). Here, the display unit 54 particularly receives moving image data as the display data which is in the middle of the processes where the CPU 51 partly processes the moving image data in moving image content. And the GPU 541 generates from the display data a series of image data which represents a series of images included in the moving images respectively. The GPU 541 sequentially outputs the generated series of image data to the display screen 31, and the display screen 31 displays moving images. That is, in the second embodiment, the role of processing moving image data to generate image data, which is an example of the roles of the image generation unit, is divided between the CPU 51 and the GPU 541. In addition, the GPU 541 has a role of sequentially outputting image data, which is an example of the roles of the image output unit. Besides, the display screen 31 is an example of the image display unit which displays moving images by sequentially displaying each image represented by each piece of image data which is sequentially output by the image output unit. A moving image output apparatus which includes such an image display unit acts as a moving image display apparatus.

In the example described below, the communication interface 55 receives moving image content in MPEG4 format sent through the Internet. When the communication interface 55 receives the moving image content, the moving image content is temporarily stored in the HDD 56. Then, a series of image data is generated from the moving image data included in the moving image content, and moving images based on the series of image data are displayed on the display screen 31 (see FIG. 2).

In addition, the audio data in the moving image content is sent to the audio output unit 57 and the audio which is in sync with the display of the moving images on the display screen 31 is output through the speaker 572.

Figure 4:
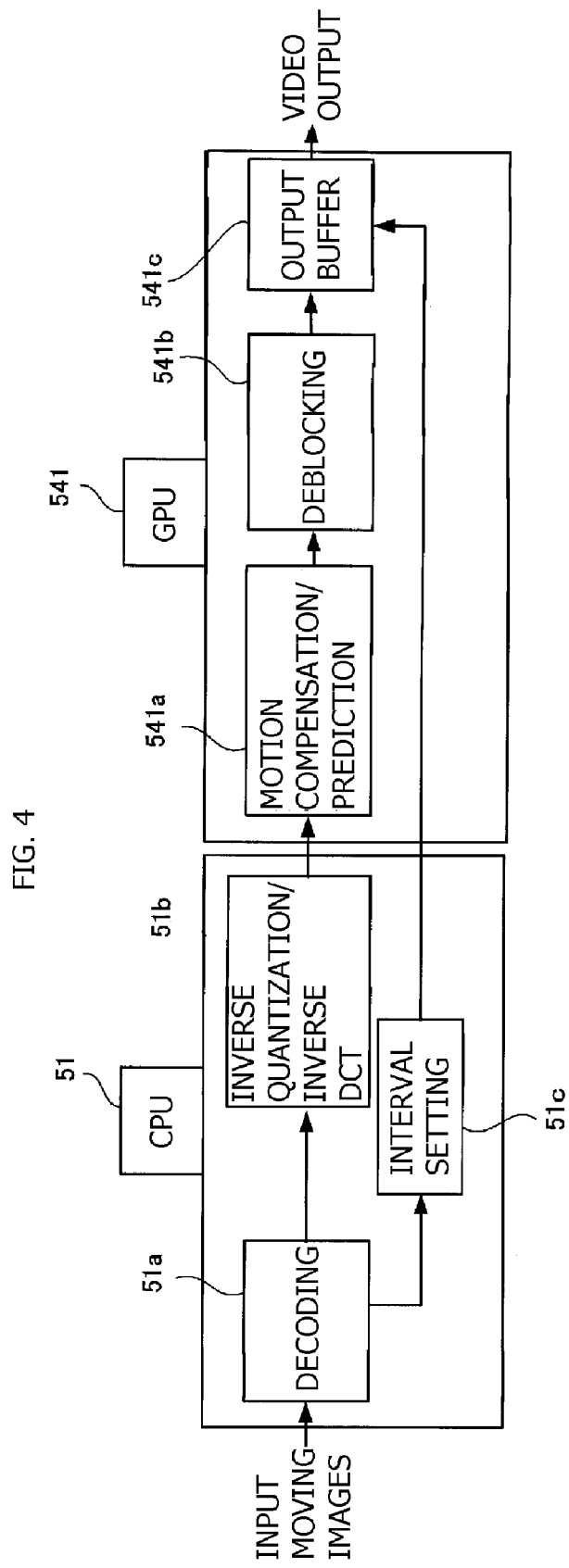
FIG. 4 is a diagram illustrating a procedure of a moving image reproduction process in the note PC depicted in FIGS. 2 and 3.

FIG. 4 is a diagram illustrating a procedure of a moving image reproduction process in the note PC illustrated in FIGS. 2 and 3.

When the CPU 51 receives input moving image data, the CPU 51 performs a decoding process 51a to the data. The input moving image data is data in an encoded format. And in the decoding process 51a, a decoding process which is called enthalpy decoding process is performed and moving image data in YCbCr format is generated. The Y data of the moving image data generated in the decoding process 51a represents the luminance of the moving images. In addition, the CbCr data of the moving image data in YCbCr format is called color difference data and represents the color of the moving images. The moving image data generated in the decoding process 51a is written in the memory 52 illustrated in FIG. 3. Then, the CPU 51 performs an inverse quantization/inverse DCT process 51b to generate moving image data for displaying. The inverse quantization process and the inverse DCT process themselves are conventional processes as reproduction processes of data in MPEG format, and therefore the detailed explanations are omitted.

The moving image data generated in the inverse quantization/inverse DCT process 51b performed by the CPU 51 is sent to the CPU 541, and the GPU 541 performs a motion compensation/prediction process 541a and a deblocking process 541b to the moving image data. The motion compensation/prediction process and the deblocking process are conventional data processes. As the result of the motion compensation/prediction process 541a and the deblocking process 541b, each piece of image data which represents each of a series of images in the moving images respectively is generated. Each piece of the generated image data is sequentially written in an output buffer 541c. The image which is represented by the image data sequentially written in the output buffer 541c is sequentially converted to video output signals and displayed on the display screen 31. As a result, the moving images are displayed on the display screen 31. That is, the output buffer 541c of the GPU 541 is an example of the image output unit for sequentially outputting image data.

The display speed of the moving image display is defined as the number of frames (images) displayed per one second. As the display speed is originally set in the input moving image data sent to the CPU 51, the CPU 51 performs an interval setting process 51c to set an output interval of the image data to the output buffer 541c of the GPU 541. For example, in the case where a display setting of 30 frames per second is set in the input moving image data, an image output setting with the interval of 33 ms is set to the output buffer 541c. That is, the CPU 51 has a role of setting a time interval corresponding to the display speed of moving images to the image output unit, which is an example of the roles of the interval setting unit, by performing the interval setting process 51c.

Meanwhile, the motion compensation/prediction process 541a includes an intra prediction process and an inter-frame prediction process, and the intra prediction process is performed in any one type of nine prediction modes, namely Mode 0 to Mode 8. The prediction mode to be performed is described in the meta-information in the moving image data which is decoded in the decoding process 51a. In addition, as a prediction mode is set to each piece of the generated image data, the prediction mode may be occasionally changed while a sequence of moving images is being played. And, as described in detail below, the loads of the GPU 541 in the intra prediction process varies in different prediction modes and therefore so does the processing time. Consequently, the timing of writing the image data to the output buffer 541c depends upon the type of the prediction mode employed for generating the image data. Thus, as described below, the CPU 51 determines in the interval setting process 51c whether or not the generation processing speed of each piece of image data is sufficient for the above display speed. And in the interval setting process 51c the CPU 51 temporarily sets an output interval longer than that corresponding to the display speed to the output buffer 541c as for the image data for which the generation processing speed is not sufficient for the display speed. This leads that even image data for which the load of the generation process is high can be generated in time with the data output from the output buffer 541*c*.

When the user of the note PC 10 illustrated in FIGS. 2 and 3 wishes the reproduction of moving image content, the user runs a reproduction application stored in the HDD 56. The reproduction application is described below.

Figure 5:
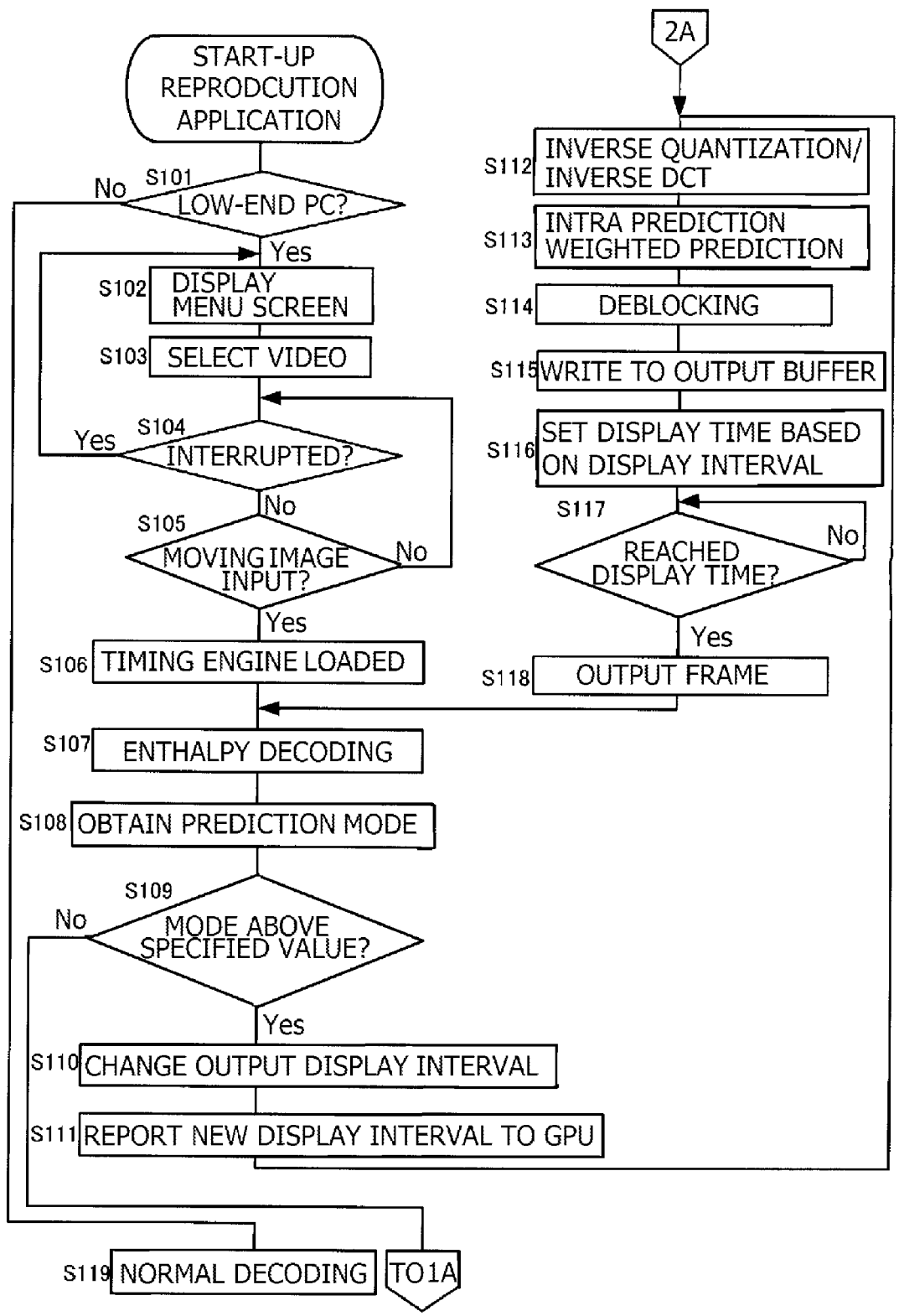
FIG. 5 is a diagram illustrating a first part of a flow chart of a reproduction application.
Figure 6:
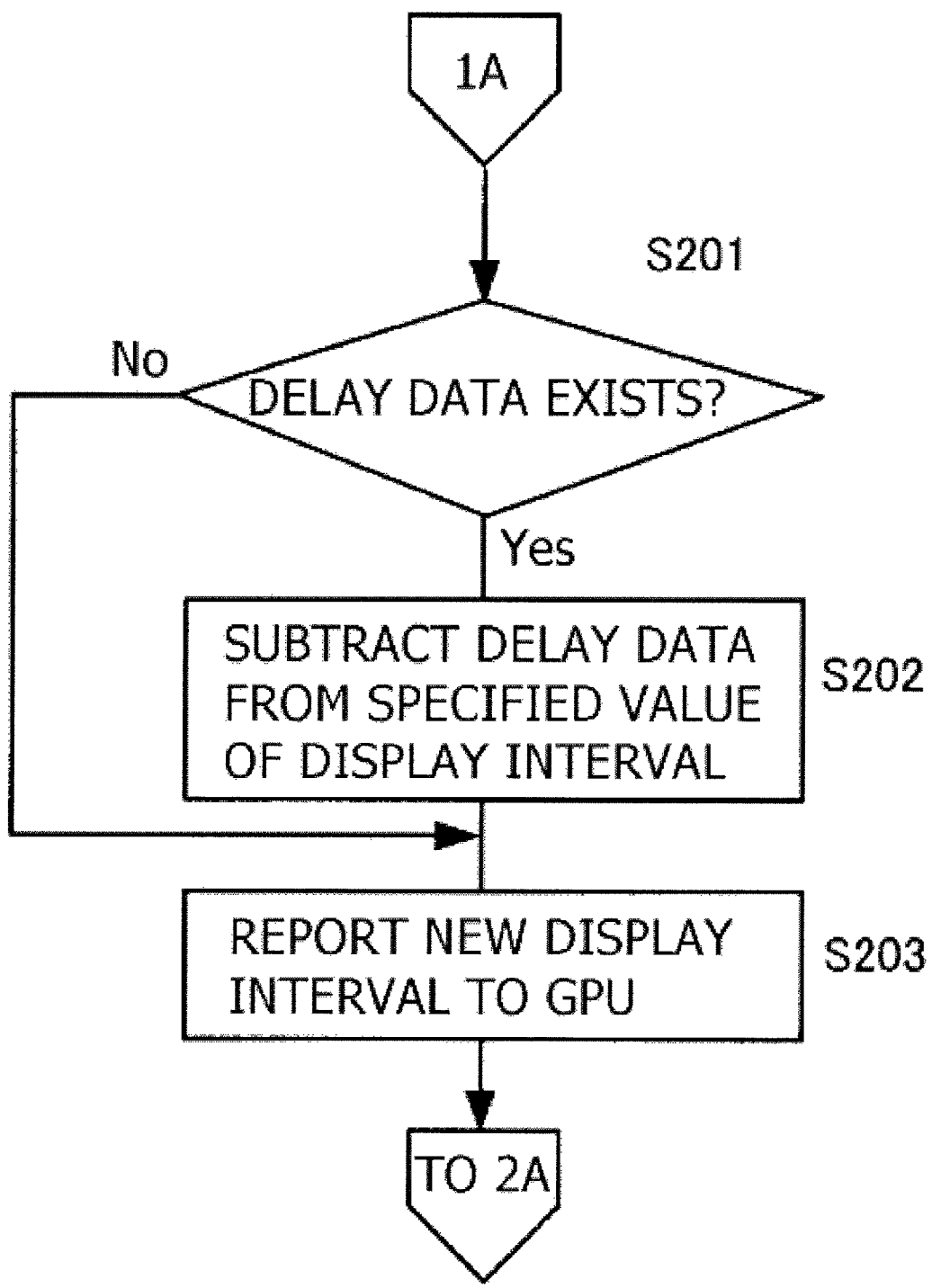
FIG. 6 is a diagram illustrating a second part of a flow chart of a reproduction application.

FIG. 5 is a diagram illustrating a first part of a flow chart of the reproduction application. Besides, FIG. 6 is a diagram illustrating a second part of a flow chart of the reproduction application. From step S109 in FIG. 5, the process proceeds to "1A" in FIG. 6. In addition, from step S203 in FIG. 6, the process proceeds to "2A" in FIG. 5. The method performed according to the flow charts illustrated in FIGS. 5 and 6 is a specific embodiment of the moving image output method.

Figure 7:
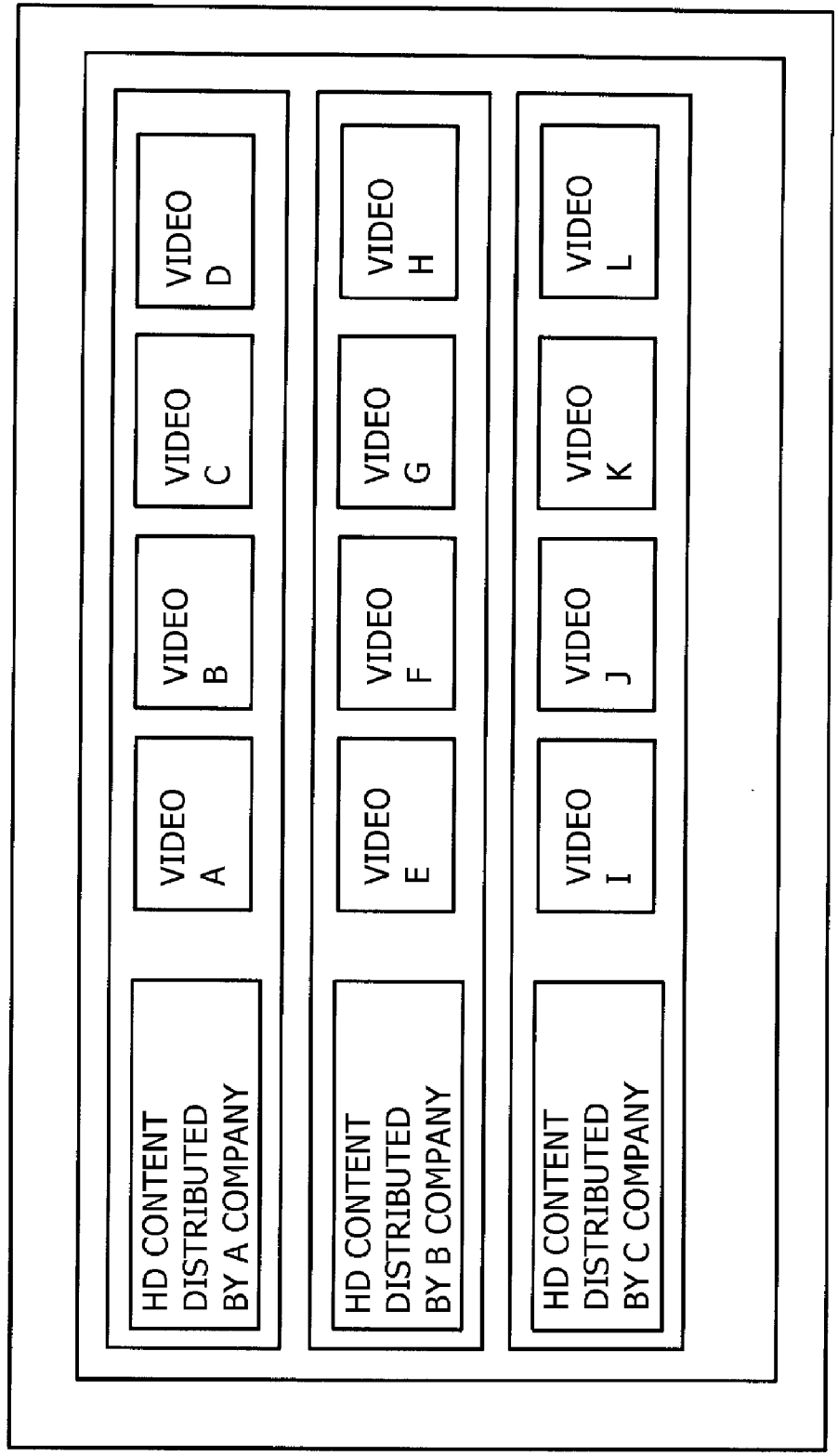
FIG. 7 is a diagram illustrating an example of a menu screen displayed on a display screen on the start-up of the reproduction application depicted in FIGS. 5 and 6.
Figure 8:
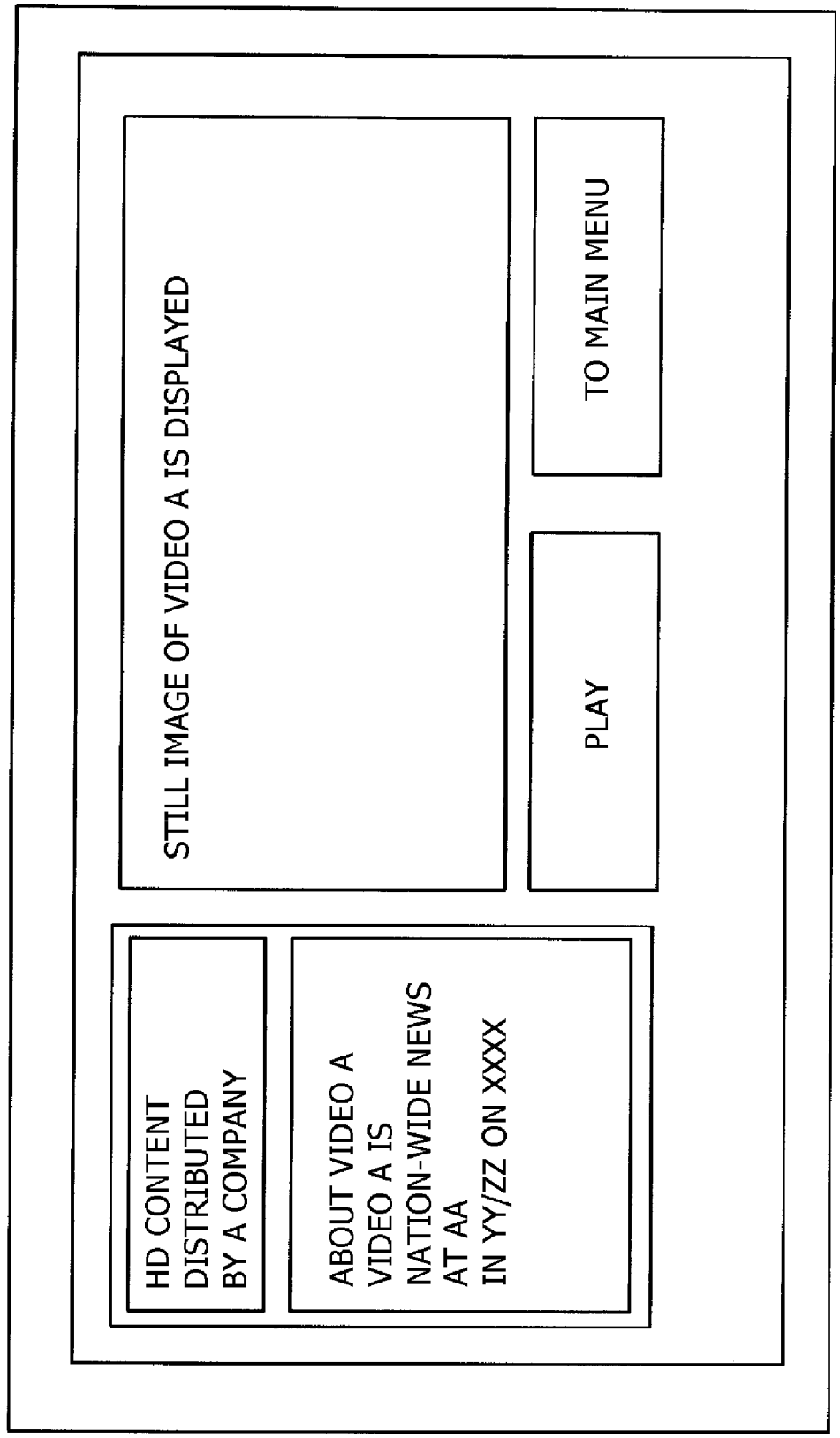
FIG. 8 is a diagram illustrating an example of a display screen when "Video A" is selected on the menu screen depicted in FIG. 7.

Also, FIG. 7 is a diagram illustrating an example of a menu screen displayed on the display screen on the start-up of the reproduction application illustrated in FIGS. 5 and 6. In addition, FIG. 8 is a diagram illustrating an example of the display screen when "Video A" is selected on the menu screen illustrated in FIG. 7.

When the reproduction application is run, first the device information such as the BIOS stored in the nonvolatile memory 53 (see FIG. 3) of the PC (the note PC illustrated in FIGS. 2 and 3) which performs the moving image reproduction is read out. And the device information is checked with the criteria which are preset in the reproduction application, and it is determined whether or not the PC is what is called a low-end PC, the performance of which is low for processing moving images (step S101).

When it is determined that the PC is not a low-end PC in the checking procedure in step S101, the process proceeds to step S119 and a normal decoding process is performed because the performance of the PC which performs the moving image reproduction is sufficiently high. Here, the normal decoding process is not merely a decoding process, but a series of processes for generating image data in order to display moving images. That is, this normal decoding process is a normal moving image reproduction process, in which the checking of the generation processing speed based on the prediction mode and the like as described above is not performed.

When it is determined that the PC is a low-end PC in the checking procedure in step S101, it is necessary to take measures to prevent the dropping frames of the moving images or the freeze of the PC because the performance of the PC which performs the moving image reproduction is low. In practice, as is often the case, various types of low-end PCs with different performances exist, but in the following explanations only one type of PC is determined as low-end for convenience of explanation.

When it is determined that the PC is a low-end PC in the checking procedure in step S101, a menu screen, which is illustrated in FIG. 7 for example, is displayed to show a list of moving image content which is downloaded from the Internet and stored in the HDD 56 (step S102). When the label "Video A" is, for example, selected on this menu screen, the screen illustrated in FIG. 8 is displayed (step S103). When the label "To the main menu" is selected on the screen illustrated in FIG. 8, the process is interrupted (step S104; Yes), and then it goes back to the menu screen illustrated in FIG. 7. Meanwhile, when the label "Play" is selected on the screen illustrated in FIG. 8, moving image content is read out from the HDD 56 and input into the memory 52 (step S105; Yes), and the reproduction of video A is initiated. Further, the normal decoding process as described above includes the processes which are identical to the above-described processes in steps S102 to S105.

When the moving image content is input into the memory 52, a program which is called timing engine is read out from the HDD 56 and loaded into the memory 52 (step S106). The timing engine is a program which performs the processing parts (particularly, the interval setting process 51*c*) executed by the CPU 51 in the moving image reproduction process as described with reference to FIG. 4. When the timing engine is loaded into the memory 52 and is performed, the enthalpy decoding process (namely, the decoding process 51*a* as illustrated in FIG. 4) is performed to the moving image data (step S107). Then, the meta-information as described above is read out from the decoded moving image data and the prediction mode described in the meta-information is checked (step S108). In addition, the information of the display speed as described above is also read out from the decoded moving image data and the output interval of the image data which corresponds to the display speed is calculated as a specified value and is stored into the memory 52.

The moving image data subject to the enthalpy decoding process has what is called a GOP (Group of Picture) structure. The GOP layer, the picture layer, the slice layer, the macrobook layer and the block layer are derived sequentially from the moving image data by performing the enthalpy decoding process. The picture layer is a layer in which a series of images included in the GOP layer is separated into individual images. The slice layer is a layer in which a single image is divided into several tiers. And the macroblock layer is a layer in which the slice layer is divided into several blocks. Each macroblock included in the macroblock layer is subject to the intra prediction process. In addition, the block layer is a processing unit of the inverse quantization/inverse DCT process. A common prediction mode in the intra prediction process is used in a single image and is described in the meta-information related to the macrobloock layer. In step S108, the prediction mode is obtained from the meta-information related to the macroblock layer as above.

Here, a break is given to the explanations of the reproduction application, and the prediction mode and the intra prediction process based on the prediction mode are described below. The explanations of the reproduction application resumes after the explanations of the prediction mode and the like.

FIGS. 9 to 17 are diagrams explaining Modes 1 to 8 of the prediction modes.

In each diagram of FIGS. 9 to 17, the elements enclosed with boxes outlined in bold lines represent known pixels, for which the pixel values are obtained by the enthalpy decoding process or the performed intra prediction, and the elements enclosed with boxes outlined in thin lines represent predicted pixels, for which the pixel values are calculated by the intra prediction process using the pixel values of the pixels in the boxes outlined in bold lines. In the explanations below, the macroblocks subject to the intra prediction have sixteen pixels in a 4×4 block in any prediction mode.

Figure 9:
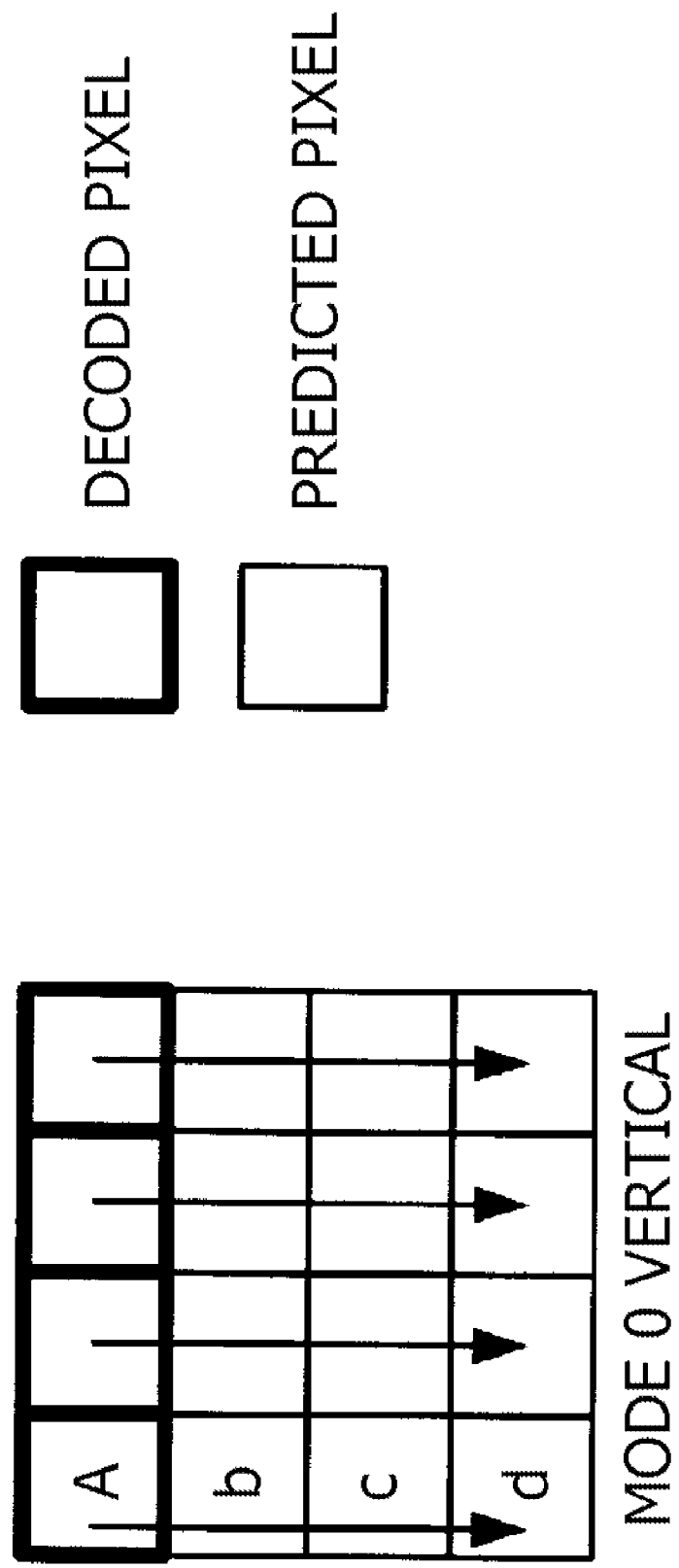
FIG. 9 is a diagram explaining Mode 0 of a prediction mode.

Mode 0 as illustrated in FIG. 9 is a prediction mode in which the pixel values of the predicted pixels are predicted by copying the pixel values of the known pixels thereto. Specifically, the value of the pixel A is copied to the pixels b, c and d in the vertical direction of the image.

Figure 10:
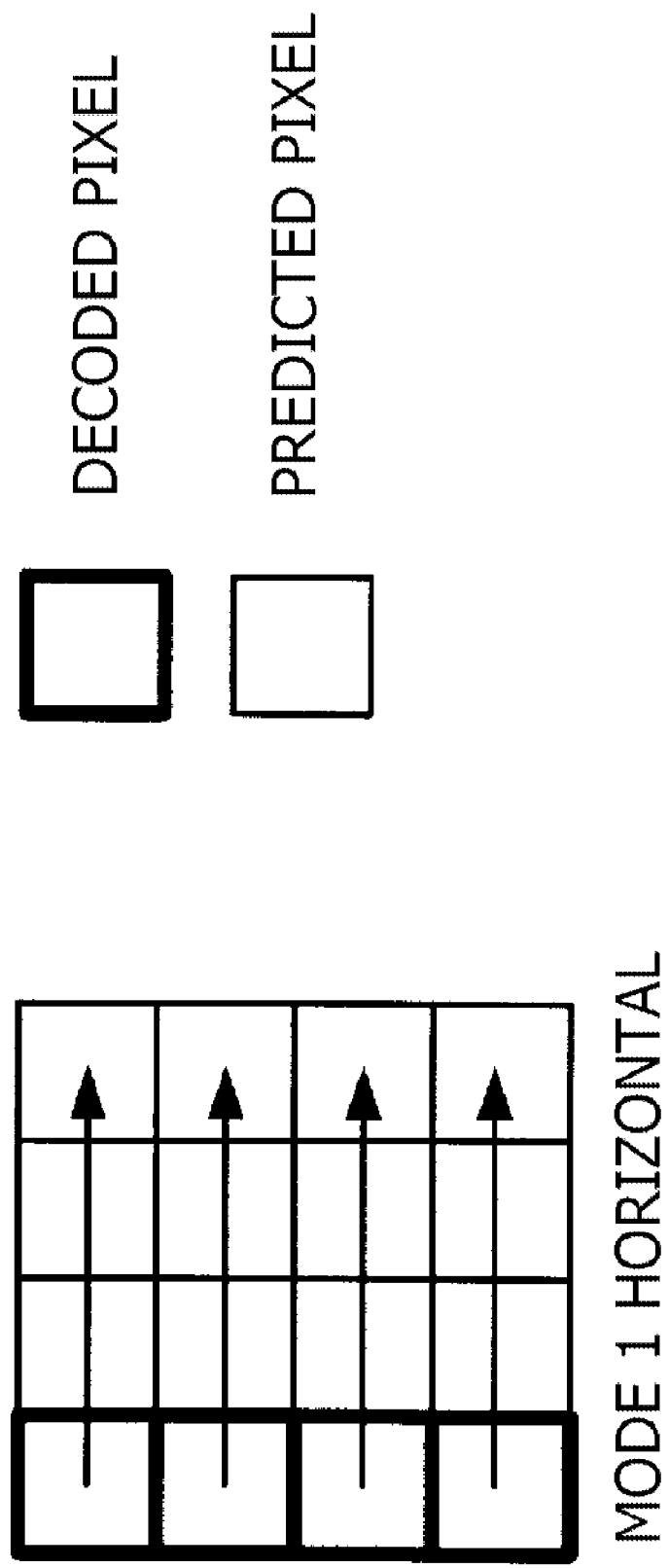
FIG. 10 is a diagram explaining Mode 1 of the prediction mode.

Similarly, in Mode 1 as illustrated in FIG. 10, the pixel values of the predicted pixels are predicted by copying the pixel values of the known pixels thereto, but the direction of copying is the horizontal direction of the image as illustrated in FIG. 10.

Mode 2 as illustrated in FIG. 11 is a prediction mode in which all the pixel values are identical. That is, j=k=m=n=o=p=q=r=s=t=u=v=w=x=y=z. And the pixel values of the predicted pixels are $(A+B+C+D+E+F+G+H+4)/8$, $(A+B+C+D+2)/4$, $(E+F+G+H+2)/4$ or $128$. It is determined by processes, the explanations of which are omitted here, which predicted value is used as the pixel value.

Figure 12:
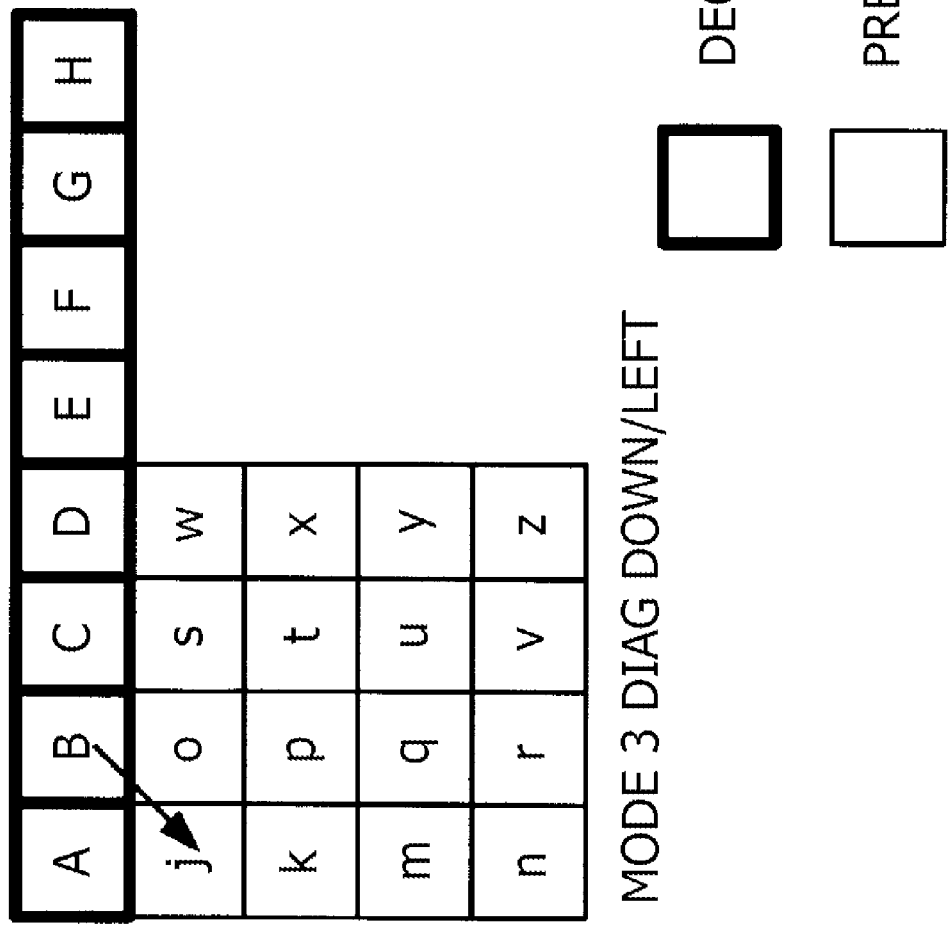
FIG. 12 is a diagram explaining Mode 3 of the prediction mode.

Mode 3 as illustrated in FIG. 12 is a prediction mode in which the pixel values of the predicted pixels located in the diagonal direction which is from upper right to lower left are identical. Specifically, the pixel values of the predicted pixels are calculated from each equation below.

$$j=(A+2*B+C+2)/4$$

$$k=o=(B+2*C+D+2)/4$$

$$m=p=s=(C+2*D+E+2)/4$$

$$n=q=t=w=(D+2*E+F+2)/4$$

$$r=u=x=(E+2*F+G+2)/4$$

$$v=y=(F+2*G+H+2)/4$$

$$z=(G+2*H+2)/4$$

Figure 13:
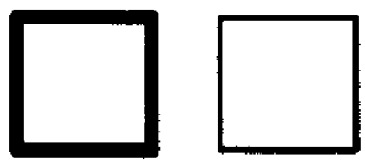
FIG. 13 is a diagram explaining Mode 4 of the prediction mode.

Mode 4 as illustrated in FIG. 13 is a prediction mode in which the pixel values of the predicted pixels located in the diagonal direction which is from upper left to lower right are identical. Specifically, the pixel values of the predicted pixels are calculated from each equation below.

$$n=(H+2*G+F+2)/4$$

$$m=r=(G+2*F+E+2)/4$$

$$k=q=v=(F+2*E+X+2)/4$$

$$j=p=w=z=(E+2*X+A+2)/4$$

$$o=t=y=(X+2*A+B+2)/4$$

$$s=x=(A+2*B+C+2)/4$$

$$w=(B+2*C+D+2)/4$$

Figure 14:
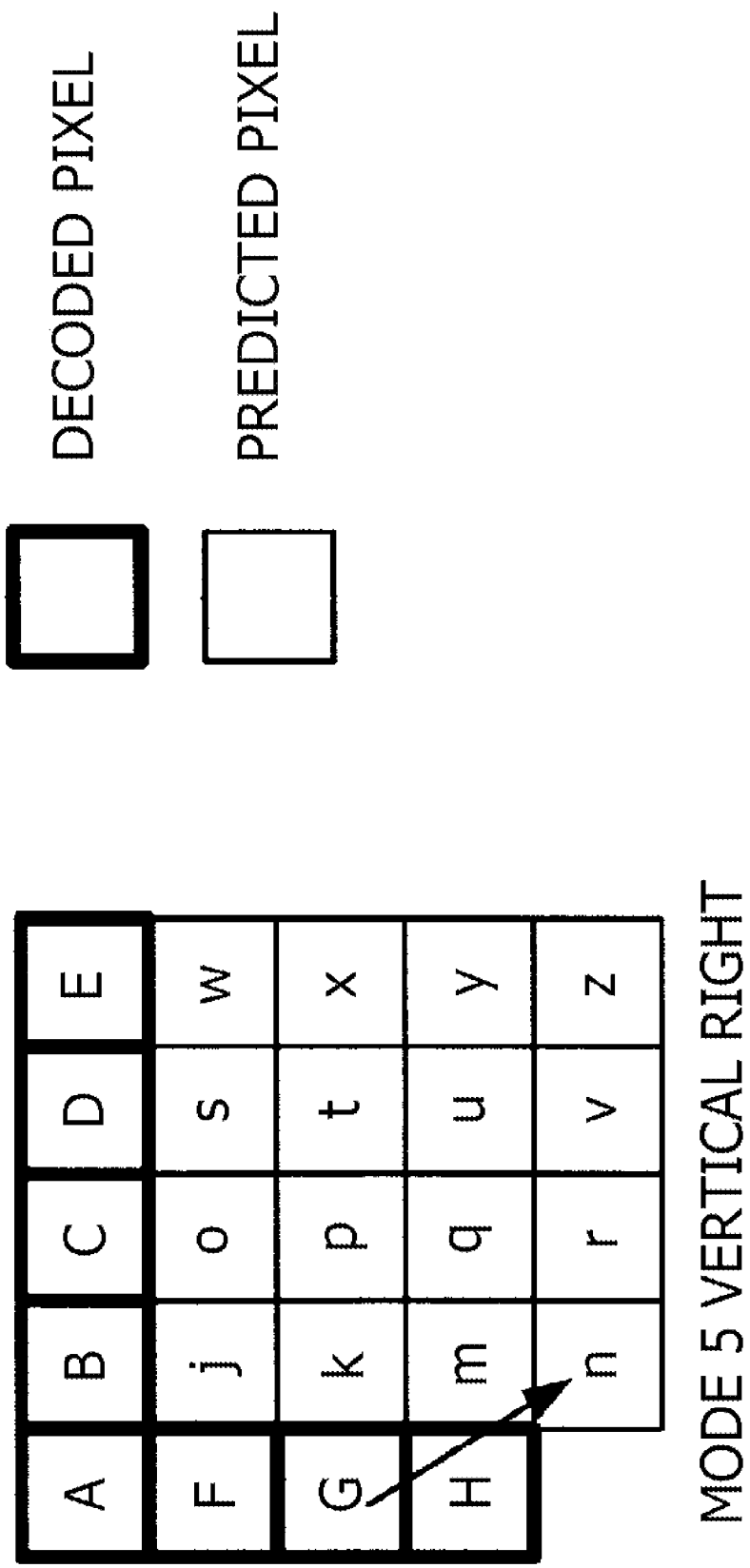
FIG. 14 is a diagram explaining Mode 5 of the prediction mode.

Mode 5 as illustrated in FIG. 14 is a prediction mode in which the pixel values of the predicted pixels located in the direction which is defined as moving two pixels down and one pixel to the right are identical. Specifically, the pixel values of the predicted pixels are calculated from each equation below.

$$j=q=(A+B+1)/2$$

$$o=u=(B+C+1)/2$$

$$s=y=(C+D+1)/2$$

$$w=(D+E+1)/2$$

$$k=r=(F+2*A+B+2)/4$$

$$p=v=(A+2*B+C+2)/4$$

$$t=z=(B+2*C+D+2)/4$$

$$x=(C+2*D+E+2)/4$$

$$m=(A+2*F+G+2)/4$$

$$n=(F+2*G+H+2)/4$$

Figure 15:
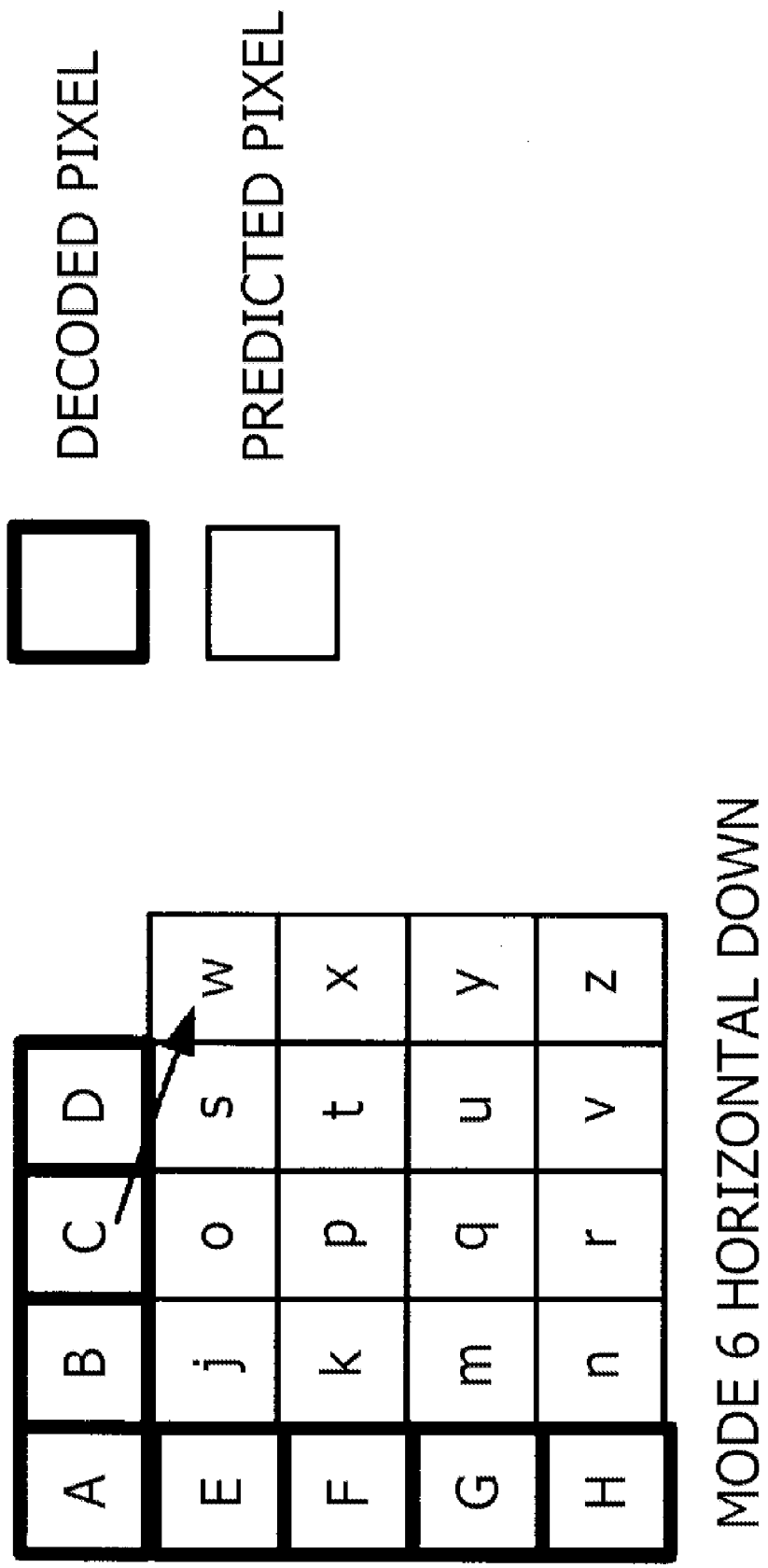
FIG. 15 is a diagram explaining Mode 6 of the prediction mode.

Mode 6 as illustrated in FIG. 15 is a prediction mode in which the pixel values of the predicted pixels located in the direction which is defined as moving two pixels to the right and one pixel down are identical. Specifically, the pixel values of the predicted pixels are calculated from each equation below.

$$j=t=(A+E+1)/2$$

$$o=x=(E+2*A+B+2)/4$$

$$s=(A+2*B+C+2)/4$$

$$w=(B+2*C+D+2)/4$$

$$k=u=(E+F+1)/2$$

$$p=y=(A+2*E+F+2)/4$$

$$m=v=(F+G+1)/2$$

$$q=z=(E+2*F+G+2)/4$$

$$n=(G+H+1)/2, r=(H+2*G+F+2)/4$$

Figure 16:
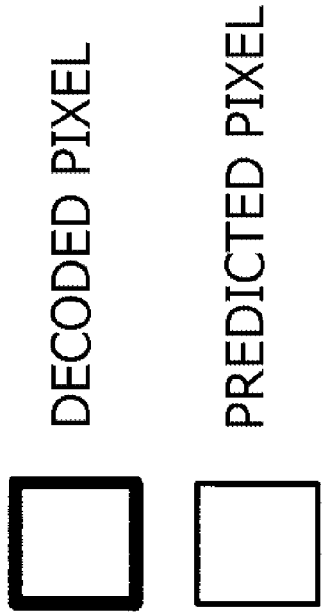
FIG. 16 is a diagram explaining Mode 7 of the prediction mode.

Mode 7 as illustrated in FIG. 16 is a prediction mode in which the pixel values of the predicted pixels located in the direction which is defined as moving two pixels down and one pixel to the left are identical. Specifically, the pixel values of the predicted pixels are calculated from each equation below.

$$j=(B+C+1)/2$$

$$m=o=(C+D+1)/2$$

$$q=s=(D+E+1)/2$$

$$u=w=(E+F+1)/2$$

$$y=(F+G+1)/2$$

$$k=(B+2*C+D+2)/4$$

$$n=p=(C+2*D+E+2)/4$$

$$r=t=(D+2*E+F+2)/4$$

$$v=x=(E+2*F+G+2)/4$$

$$z=(F+2*G+H+2)/4$$

Figure 17:
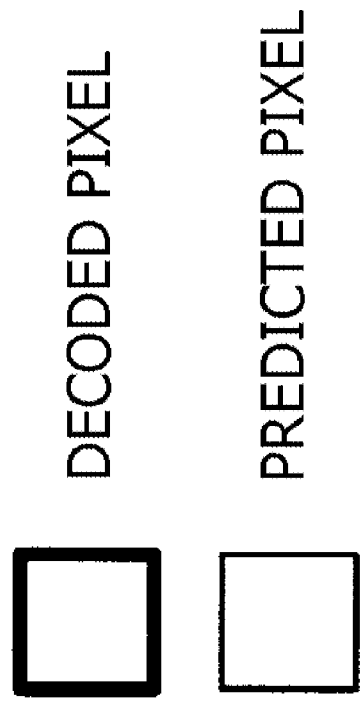
FIG. 17 is a diagram explaining Mode 8 of the prediction mode.

Mode 8 as illustrated in FIG. 17 is a prediction mode in which the pixel values of the predicted pixels located in the direction which is defined as moving two pixels to the right and one pixel up are identical. Specifically, the pixel values of the predicted pixels are calculated from each equation below.

$$j=(A+E+1)/2$$

$$o=(A+2*E+F+2)/4$$

$$k=s=(E+F+1)/2$$

$$p=w=(E+2*F+G+2)/4$$

$$m=t=(F+G+1)/2$$

$$q=x=(F+3*G+2)/4$$

$$n=r=v=y=z=G$$

The pixel values of the predicted pixels are calculated as described above in each prediction mode, and therefore the processing load required for performing the calculations is the highest in Mode 2. And Modes 5 and 7 yield the second highest load, followed by Mode 6 and Mode 8. Modes 3 and 4 yield a still lower load, and Modes 0 and 1 yield the lowest load. In the explanations below, the processing times corresponding to the processing loads are predetermined, and the processing times are stored in association with the reproduction application. And when the prediction mode is checked, the processing time is also checked.

In step S108 illustrated in FIG. 5, the prediction mode as described above is determined from the meta-information. And in step S109, it is checked whether or not the determined prediction mode is a prediction mode which requires a processing time longer than the above-described specified value of the output interval of image data.

When it is determined that the prediction mode is a prediction mode which requires a processing time longer than the above-described specified value, the output interval (display interval) of image data of the output buffer 541c (see FIG. 4) is changed from the specified value so as not to trigger the dropping frames of the moving images or the freeze of the PC when the moving images are being reproduced (step S110). The newly changed output interval is an output interval which corresponds to the processing time required in the prediction mode. And the newly changed output interval (display interval) is reported to the GPU (step S111). At this point, the delay time during which the output of image data is delayed with reference to the specified output interval is calculated and stored as delay data in the memory 52 (see FIG. 3).

As the determinations in steps S108 and S109 are made based on the prediction mode which the moving image data sets for each image, prompt and precise determinations can be carried out prior to the generation of image data. As a result, in steps S110 and S111, the output interval can be changed if necessary before the output interval of image data reaches the specified value. This means that an applied embodiment as described below is preferable in the moving image output apparatus. In the applied embodiment, the moving image data as described above includes mode information which indicates a processing mode for each image in the generation process of the image data. And in the applied embodiment the image generation unit as described above generates image data in the processing mode indicated in the mode information included in the moving image data acquired by the moving image acquisition unit. Moreover, in the applied embodiment the interval setting unit determines for each piece of image data based on the mode information included in the moving image data acquired by the moving image acquisition unit whether or not the image generation is performed by the image generation unit in time with the sequential output with the first time interval.

The processes performed in steps S108 to S111 as described above correspond to an example of processes performed in the interval setting unit in the applied embodiment. In addition, the processes performed in steps S112 to S114 described below correspond to an example of processes performed in the image generation unit in the applied embodiment.

Subsequently, the inverse quantization/inverse DCT process is performed to the moving image data to which the enthalpy decoding process has been performed in step S107 (step S112). The moving image data to which the inverse quantization/inverse DCT process has been performed is sent to the GPU 541 (see FIG. 4) this time. The GPU 541 performs the intra prediction process and the weighted prediction (step S113), which correspond to the motion compensation/prediction process as described above, and the deblocking process (step S114). This intra prediction process is performed in the prediction mode which has been determined in step S108. These processes generate image data for displaying moving images and the generated image data is written to the output buffer (step S115). Then, the CPU 541 sets the output time of the image data (namely, the display time of the image) to the output buffer based on the reported display interval (step S116). The output time (display time) set at this point is an output time (display time) which has been changed from the specified value if necessary so as not to trigger the dropping frames of the moving images or the freeze of the PC when the moving images are being reproduced.

Following step S116, it remains in waiting state until it reaches the set display time (step S117), and when it reaches the set display time the output buffer outputs the image data of the concerned frame (step S118). As the output interval (display interval) is changed in step S110 as described above, the writing of the image data in step S115 is performed with a timing which allows enough time for the output interval. Thus, in step S117 the waiting state continues for the time period corresponding to the time allowance. After the image data is output, the procedure goes back to step S107 described above and the processes of the moving image data proceed in order to generate the image data of the subsequent frame.

When it is determined that the prediction mode is a prediction mode which requires a processing time longer than the specified value in step S109 described above, the processes as described above are performed to prevent the dropping frames of the moving images or the freeze of the PC when the moving images are being reproduced. However, the output timing of the image data is slightly delayed in comparison with the original output timing. Here in this embodiment, arrangements are implemented to make up for the delay. The procedures in which such arrangements are employed are described below.

When it is determined that the prediction mode is a prediction mode which requires a processing time shorter than the specified value, which means that the generation of the image data is performed in time with the output thereof with the specified value, the procedure goes to step S201 illustrated in FIG. 6. In step S201, it is determined with reference to the memory 52 whether or not the delay data as described above is stored in the memory 52. When it is determined that the delay data is stored in the memory 52, this means that the output timing of the image data is delayed in comparison with the original output timing, and therefore, as for the output interval (display interval) of the image data, a value is subtracted from the specified value in step S202. At this point, if the processing time required for generating the image data is shorter enough than the specified value in the current prediction mode, a value corresponding to the output interval delay indicated by the delay data is subtracted from the specified value. However, if the processing time is not enough for making up for the whole delay indicated by the delay data, the new output interval is an output interval corresponding to the processing time. And the delay data is rewritten according to the amount of the delay which has been made up for by changing the output interval.

Then, the newly changed output interval (display interval) is reported to the GPU in step S203. However, if it is determined that delay data is not detected in step S201, the output interval is not changed, and therefore the specified value of the output interval is reported to the GPU in step S203. And then, the procedure goes from step S203 to step S112 in FIG. 5, the image data is generated in steps S112 to S114, and the image data is written to the output buffer in step S115. Subsequently, the image data is output in the output interval which corresponds to the specified value or is shorter than the specified value in step S116. As a result, the delay in the output timing of the image data is made up for, and therefore the moving images are displayed at the original display speed in a certain time period.

This means that an applied embodiment of the moving image output apparatus as described below is preferable. In this applied embodiment, the interval setting unit sets a third time interval which is shorter than the first time interval to the image output unit as for the image data to be output after the second time interval is temporarily set. And the setting of the third time interval becomes effective until the delay in outputting the image data due to the setting of the second time interval is fully made up for.

The moving image display which is achieved as the result of the processes of the reproduction application described above is described below. Here, the display speed set in the moving image data is 30 frames per second.

Figure 18:
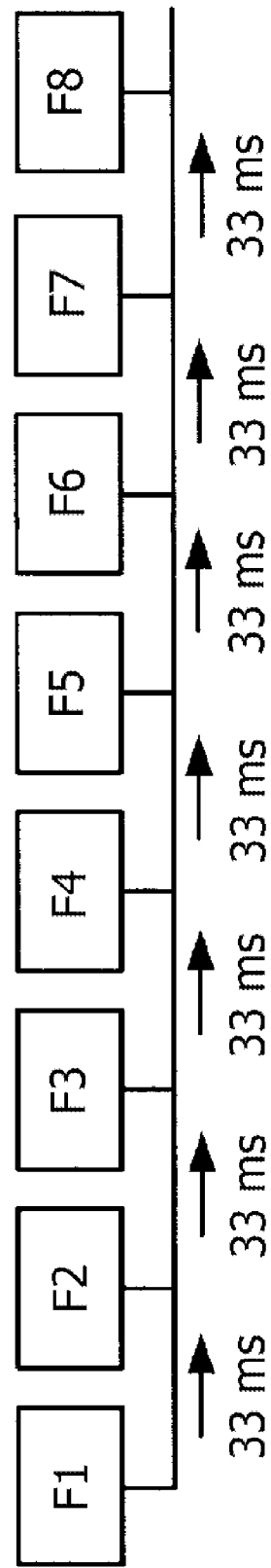
FIG. 18 is a diagram illustrating the moving image display when the generation of image data occurs in time with the output of image data with a specified value.

FIG. 18 is a diagram illustrating the moving image display when the generation of image data occurs in time with the output of image data with a specified value.

FIG. 18 illustrates eight images F1 to F8 as images (frames) included in moving images. FIG. 18 also illustrates that the image data of each image is output in the output interval of 33 ms from the output buffer 541c (see FIG. 4). As a result, the moving image display is achieved in the display speed of 30 frames per second on the display screen 31 illustrated in FIG. 3. The moving image display as illustrated in FIG. 18 is achieved when the PC demonstrates a sufficient performance for processing moving images or the prediction mode is a prediction mode in which the processing load is low.

An phenomenon caused when a conventional low-end PC performs the image data generation in a prediction mode in which the processing load is high is described as a comparative example below.

Figure 19:
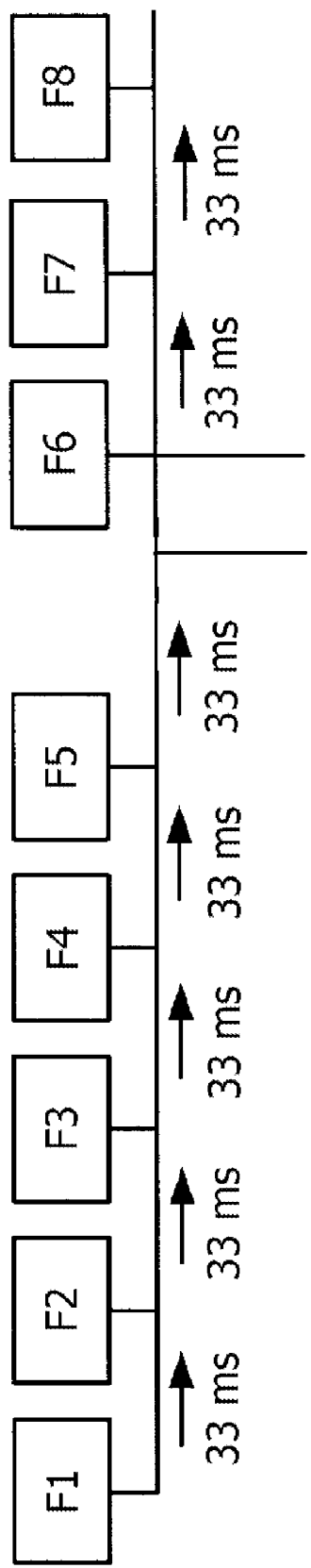
FIG. 19 is a diagram illustrating a comparative example.

FIG. 19 is a diagram illustrating the comparative example.

FIG. 19 also illustrates eight images F1 to F8 as images (frames) included in moving images. And this example illustrates that the image data of images F1 to F5 is output in the output interval of 33 ms from the output buffer 541c without problems but the generation of the image data of image F6 fails to occur in time with the output interval of 33 ms. When the generation of the image data fails to occur in time with the output interval, the output buffer 541c cannot perform its normal output operation, and therefore problems such as frame droppings and the freeze of PC occur in the moving image display.

Figure 20:
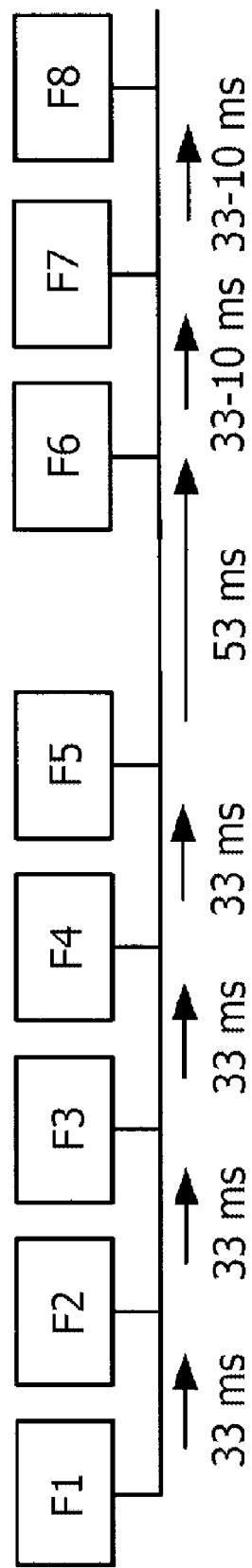
FIG. 20 is a diagram illustrating the moving image display according to an embodiment when image data is generated in a prediction mode in which the processing load is high.

FIG. 20 is a diagram illustrating the moving image display according to this embodiment when image data is generated in a prediction mode in which the processing load is high.

FIG. 20 also illustrates eight images F1 to F8 as images (frames) included in moving images. And this example also illustrates that but the generation of the image data of image F6 fails to occur in time with the output interval of 33 ms, which corresponds to the specified value. However, in this embodiment, the output interval of the image data is temporarily changed to an output interval which is long enough so that the generation of the image data occurs in time with the output thereof. In the example described herein, the generation time of the image data of image F6 is set to 54 ms, which means that a 20 ms delay is added to the specified value of 33 ms. And the output interval of 54 ms is temporarily set to the output buffer 541c in accordance with the generation time. As a result, the image data of image F6 is output from the output buffer 541c without problems, and therefore the moving image display continues without problems. However, in this embodiment, as the 20 ms delay exists, the output intervals of the image data of images F7 and F8 transferred subsequent to image F6, which causes the delay, are shortened to the extent that the generation of the image data occurs in time with the output thereof. In this example, the generation of one piece of image data is performed with a remainder of 10 ms for the interval of 33 ms, and therefore the generation of two pieces of image data achieves a recovery from the delay with a total of 20 ms. Following the recovery from the delay as described above, the output interval is set back to 33 ms. As the delay in the image processing and the recovery from the delay are so subtle that human eyes cannot detect them, it is fair to say that the moving image display described above is a normal moving image display. In addition, as the short delay described above is a delay which poses little problem for the moving image display, the delay may be left uncontrolled safely in many cases. However, it is desirable to recover the delay as in this embodiment because, for example, the viewers may find a subtle out-of-sync audio or multiple delays are accumulated so that the viewers may find the delays.

This is the end of the explanations of the embodiments of the present invention.

Although the above explanations set forth an example in which the moving image display is performed at the display speed set in the moving image data, the moving image output apparatus and the moving image output method according to an aspect of the embodiments may also be employed for play modes such as slow motion play and search play, in which the set display speed is adjusted.

Further, the above explanations set forth an example in which it is determined based on the prediction mode prior to the generation of the image data whether or not the generation of the image data occurs in time with the output thereof. However, in the moving image output apparatus and the moving image output method according to an aspect of the embodiments, the determination may be made in parallel with the generation of the image data and the actual processing speed for the generation process may be used as the information for the determination.

Moreover, the above explanations set forth an example in which the processes for recovering from the delay caused by setting a longer output interval are incorporated. However, in the moving image output apparatus and the moving image output method according to an aspect of the embodiments, the recovery processes may be omitted in a case of which the delay is not considered to be significant.

Additionally, the above explanations set forth an example in which the display screen 31 displays the moving images based on the moving image data for displaying which are subject to the reproduction operation. However, it is not always necessary that the moving image data for displaying is displayed on the apparatus itself which performs the reproduction operation. For example, the moving image data for displaying may be stored in portable storage media such as DVD and Blu-ray Disc. Instead, the moving image data for displaying may be output externally as-is and displayed on an image display apparatus.

According to the disclosure herein, the moving image output is achieved with preserving the original image quality even if the display speed of the moving image data is faster than the processing speed of the processing unit.

All example and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A moving image output apparatus, comprising:
a moving image acquisition unit to acquire moving image data which represents a moving image as a collection of a plurality of images which are successive in time;
an image generation unit to generate each piece of image data which represents each image of the moving image by processing the moving image data acquired by the moving image acquisition unit;
an image output unit to sequentially output each piece of image data generated by the image generation unit according to a set time interval; and
an interval setting unit to set to the image output unit a first time interval corresponding to a display speed of the moving image, and to temporarily set to the image output unit a second time interval which is longer than the first time interval as for image data for which the generation by the image generation unit fails to occur in time with the sequential output with the first time interval by the image output unit,
wherein as for image data to be output after the second time interval is temporarily set, the interval setting unit sets a third time interval which is shorter than the first time interval to the image output unit until a delay in outputting the image data due to the setting of the second time interval is made up for.

2. The moving image output apparatus according to claim 1, further comprising an image display unit to display the moving image by sequentially displaying each image represented by each piece of image data based on each piece of image data which is sequentially output from the image output unit.

3. The moving image output apparatus according to claim 1, wherein:
the moving image data includes mode information which indicates a processing mode for each image in a generation process of image data,
the image generation unit generates image data in the processing mode indicated in the mode information included in the moving image data acquired by the moving image acquisition unit, and
the interval setting unit determines for each piece of image data based on the mode information included in the moving image data acquired by the moving image acquisition unit whether or not the generation by the image generation unit is performed in time with the sequential output with the first time interval.

4. A method for outputting a moving image, the method comprising:
acquiring moving image data which represents a moving image as a collection of a plurality of images which are successive in time;
generating each piece of image data which represents each image of the moving image by processing the moving image data acquired by the acquiring moving image data;
sequentially outputting, according to a first time interval, each piece of image data generated by the generating each piece of image data, wherein image data for which the generating each piece of image data fails to occur in time with the sequentially outputting according to the first time interval is output according to a second time interval which is longer than the first time interval,
wherein in the sequentially outputting each piece of image data, the image data to be output after the second time interval is temporarily set is output with a third time interval which is shorter than the first time interval until a delay in outputting the image data due to the setting of the second time interval is made up for.

5. The method for outputting a moving image according to claim 4, the method further comprising:
displaying the moving image by sequentially displaying each image represented by each piece of image data based on each piece of image data which is sequentially output by the sequentially outputting each piece of image data.

6. The method for outputting a moving image according to claim 4, wherein:
the moving image data includes mode information which indicates a processing mode for each image in a generation process of image data,
in the generating each piece of image data, the image data is generated in the processing mode indicated in the mode information included in the moving image data acquired by the acquiring moving image data, and
in the sequentially outputting each piece of image data, it is determined for each piece of image data based on the mode information included in the moving image data acquired by the acquiring moving image data whether or not the generating each piece of image data is performed in time with the sequential output with the first time interval.

7. A non-transitory computer-readable storage medium having stored therein a program for causing a computer to execute a moving image output process comprising:
acquiring moving image data which represents a moving image as a collection of a plurality of images which are successive in time;
generating each piece of image data which represents each image of the moving image by processing the moving image data acquired by the acquiring moving image data;
sequentially outputting, according to a first time interval, each piece of image data generated by the generating each piece of image data, wherein image data for which the generating each piece of image data fails to occur in time with the sequentially outputting according to the first time interval is output according to a second time interval which is longer than the first time interval,
wherein in the sequentially outputting each piece of image data, the image data to be output after the second time interval is temporarily set is output with a third time interval which is shorter than the first time interval until a delay in outputting the image data due to the setting of the second time interval is made up for.

8. The non-transitory computer-readable storage medium according to claim 7, wherein:
the moving image data includes mode information which indicates a processing mode for each image in a generation process of image data,
in the generating each piece of image data, the image data is generated in the processing mode indicated in the mode information included in the moving image data acquired by the acquiring moving image data, and
in the sequentially outputting each piece of image data, it is determined for each piece of image data based on the mode information included in the moving image data acquired by the acquiring moving image data whether or not the generating each piece of image data is performed in time with the sequential output with the first time interval.

9. The moving image output apparatus according to claim 1, wherein
the moving image data includes mode information which includes a prediction mode for intra prediction process of the plurality of images which are successive in time, and
the interval setting unit determines for each piece of image data based on the mode information whether or not the image generation unit fails to occur in time with the sequential output with the first time interval by the image output unit.

10. The moving image output apparatus according to claim 1, wherein
the moving image data is encoded data, and
the moving image output apparatus further comprises a control unit to control the image generation unit to decode a first piece of image data of the moving image data and decode a second piece of image data of the moving image data which is subsequent to the first piece of image data after the image output unit outputs the first piece of image data.

11. The moving image output apparatus according to claim 1, further comprising:
a processing unit to write each piece of image data output by the image output unit to an output buffer; and
a display unit to sequentially display each piece of image data written to the output buffer on a display apparatus according to the display speed.

12. The method for outputting a moving image according to claim 4, wherein
the moving image data includes mode information which includes a prediction mode for intra prediction process of the plurality of images which are successive in time, and
the method further comprises determining for each piece of image data based on the mode information whether or not the generating each piece of image data fails to occur in time with the sequentially outputting according to the first time interval.

13. The method for outputting a moving image according to claim 4, wherein
the moving image data is encoded data, and
the method further comprises controlling the generating each piece of image data to decode a first piece of image data of the moving image data and decode a second piece of image data of the moving image data which is subsequent to the first piece of image data after the first piece of image data is output.

14. The method for outputting a moving image according to claim 4, further comprising:
writing each piece of image data output by the image output unit to an output buffer; and
sequentially displaying each piece of image data written to the output buffer on a display apparatus according to the display speed.

15. The non-transitory computer-readable storage medium according to claim 7, wherein
the moving image data includes mode information which includes a prediction mode for intra prediction process of the plurality of images which are successive in time, and
the moving image output process further comprises determining for each piece of image data based on the mode information whether or not the generating each piece of image data fails to occur in time with the sequentially outputting according to the first time interval.

16. The non-transitory computer-readable storage medium according to claim 7, wherein
the moving image data is encoded data, and
the moving image output process further comprises controlling the generating each piece of image data to decode a first piece of image data of the moving image data and decode a second piece of image data of the moving image data which is subsequent to the first piece of image data after the first piece of image data is output.

17. The non-transitory computer-readable storage medium according to claim 7, the moving image output process further comprising:
writing each piece of image data output by the image output unit to an output buffer; and
sequentially displaying each piece of image data written to the output buffer on a display apparatus according to the display speed.

* * * * *